United States Patent [19]

McConica et al.

[11] Patent Number: 5,586,212
[45] Date of Patent: Dec. 17, 1996

[54] OPTICAL WAVE GUIDE FOR HAND-HELD SCANNER

[75] Inventors: Charles McConica, Fort Collins; Virgil Russon, Greeley, both of Colo.

[73] Assignee: Hewlett-Packard, Palo Alto, Calif.

[21] Appl. No.: 271,312

[22] Filed: Jul. 6, 1994

[51] Int. Cl.$^6$ .................................. G02B 6/10; H01J 3/14
[52] U.S. Cl. ........................ 385/146; 250/234; 235/473
[58] Field of Search .................................. 385/146, 147, 385/900, 901, 116, 119, 120, 121, 32; 362/32; 235/462, 467, 472, 473; 250/234, 235, 236, 201.2, 201.5, 226; 359/201, 210, 211, 212, 833, 834, 837

[56] References Cited

U.S. PATENT DOCUMENTS

| | | | |
|---|---|---|---|
| 3,663,083 | 5/1972 | Friedman et al. | 385/146 |
| 4,114,592 | 9/1978 | Winston | 385/900 |
| 4,240,692 | 12/1980 | Winston | 385/146 |
| 4,709,144 | 11/1987 | Vincent | 250/226 |
| 4,813,765 | 3/1989 | Negishi | 385/146 |
| 4,870,268 | 9/1989 | Vincent et al. | 250/226 |
| 4,926,041 | 5/1990 | Boyd | 250/226 |
| 5,038,028 | 8/1991 | Boyd et al. | 250/208.1 |
| 5,155,790 | 10/1992 | Hwang | 385/121 |
| 5,323,477 | 6/1994 | Lebby et al. | 385/146 |
| 5,464,972 | 11/1995 | Massieu et al. | 235/462 |

Primary Examiner—Rodney B. Bovernick
Assistant Examiner—Hemang Sanghavi

[57] ABSTRACT

First and second elongate curved reflecting surfaces positioned in non-parallel, spaced apart relation collect light from an elongate light source and direct it onto a scanning area. One edge of the first curved reflecting surface is positioned adjacent the light source and the opposite edge is positioned adjacent the illuminated scan area so that the first curved reflecting surface extends from about the light source to about the illuminated scan area. The second curved reflecting surface is positioned in opposed spaced-apart non-parallel relation to the first curved reflecting surface such that the distance separating the reflecting surfaces at the light source is less than the distance separating the reflecting surfaces at the end adjacent the illuminated scanning area. An elongate planar reflecting surface is positioned adjacent the second curved reflecting surface so that it is substantially perpendicular to the illuminated scan area. Some of the light rays from the light source are reflected by the first curved reflecting surface and the second curved reflecting surface onto the planar reflecting surface, which in turn reflects the light rays onto the illuminated scan area so that they are incident on the illuminated scan area at substantially oblique angles. Other light rays from the light source are directly reflected by either the first curved reflecting surface, the second curved reflecting surface, or by a combination of the two, onto the illuminated scan area so that they are also incident on the illuminated scan area at substantially oblique angles.

19 Claims, 5 Drawing Sheets

OPTICAL WAVE GUIDE FOR HAND-HELD SCANNER

BACKGROUND

This invention relates to optical scanners in general and more specifically to an optical wave guide for directing light from a light source in the scanner onto the surface of an object being scanned.

Optical scanners are well-known in the art and produce machine-readable data which are representative of a scanned object, e.g. a page of printed text. Most optical scanners employ line-focus systems in which light from an illuminated scan line on the object is imaged by a lens onto a linear photosensor array or detector positioned remotely from the object. The linear photosensor array is typically a single dimension array of photoelements that correspond to small area locations along the illuminated scan line. These small area locations are commonly referred to as "picture elements" or "pixels." Each photoelement produces a data signal that is representative of the intensity of light from the corresponding pixel. The data signals from the photoelements are received and processed by an appropriate data processing system which may subsequently store the data on a suitable medium or generate a display signal therefrom for reproducing an image of the object with a display device such as a CRT or a printer.

Optical scanners and various components thereof are disclosed in U.S. Pat. Nos. 4,926,041 for OPTICAL SCANNER of David Wayne Boyd; U.S. Pat. No. 4,709,144 for COLOR IMAGER UTILIZING NOVEL TRICHROMATIC BEAM SPLITTER AND PHOTOSENSOR of Kent J. Vincent; U.S. Pat. No. 4,870,268 for COLOR COMBINER AND SEPARATOR AND IMPLEMENTATIONS of Kent J. Vincent and Hans D. Neuman; and U.S. Pat. No. 5,038,028 for OPTICAL SCANNER APERTURE AND LIGHT SOURCE ASSEMBLY of Boyd, et al.; and U.S. patent application Ser. No. 07/906,144 filed Jun. 29, 1992 for APPARATUS FOR ASSEMBLING COMPONENTS OF COLOR OPTICAL SCANNERS of Elder, et al., which are each hereby specifically incorporated by reference for all that is disclosed therein.

A hand-held optical scanner is an optical scanner which is moved across a scanned object, e.g. a page of text, by hand. Such hand-held optical scanners or hand scanners are also well-known in the art and various components thereof are disclosed in U.S. patent application Ser. No. 08/271,401 for Hand-Held Optical Scanner with Speed Control of McConica, et al. and U.S. patent application Ser. No. 08/271,333 for Light Path for Hand-Held Scanner of McConica, both of which are filed concurrently herewith, and the disclosures of which are each hereby specifically incorporated by reference.

Many of the early hand scanners were powered by an external power source such as a power unit connected to a wall outlet that was in turn connected to the hand scanner by an electrical cable. Such external power sources were usually necessary due to the significant electrical power required to operate the various scanner components. For example, the optical imaging assembly of a scanner typically comprises an illumination source such as an array of light emitting diodes (LEDs) or a fluorescent bulb. The scanner photoelectric conversion assembly (typically a CCD) also requires electrical energy as do the scanner speed detection circuitry and the scanner central processing unit.

As with most electronic devices, improvements in technology have allowed for the development of practical battery powered hand scanners. Of course, a significant advantage of a battery powered hand scanner is that the onboard power source and mass data storage assembly eliminate the need for external power connections or other connecting cables which tether the scanner to a fixed location. Such an arrangement also significantly improves the mobility and potential use applications for such a hand scanner.

While battery powered hand scanners have many advantages, they are still not without their problems. For example, a significant problem relates to short battery life, and efforts are constantly being made to reduce the electrical load on the battery by improving the efficiency of those components that place the largest drain on the battery, such as the light source for illuminating the scanning area and the speed control system for ensuring that the scanner is moved across the object being scanned at the optimum scanning speed. Battery life has also been increased by using an electric generator connected to the rollers of the scanner to recharge the battery as the operator rolls the scanner over the object.

Other problems common to hand scanners relate to the light source for illuminating the scan line. For example, it is difficult to provide illumination of sufficient intensity and uniformity along the length of the scan line while at the same time reducing specular reflections from the illuminated object, which can result in scanning errors. There is also a constant need to capture and direct onto the scanning area as much light as possible from the light source to allow lower power light sources to be used.

Consequently, there remains a need for a hand scanner having the features and performance typically associated with full sized desk top scanners, but in a portable, compact package. Ideally, such a hand scanner should be relatively easy and inexpensive to produce, while at the same time achieving efficient and uniform scan line illumination to increase battery life and reduce scanning errors. Scanning errors could be further reduced by reducing or eliminating specular reflections from the illuminated scanning area. Until the present invention, no such device existed.

SUMMARY OF THE INVENTION

This invention may comprise an optical wave guide for a hand held scanner comprising first and second elongate curved reflecting surfaces positioned in non-parallel, spaced apart relation for collecting light from an elongate light source and directing it onto the scanning area. One edge of the first curved reflecting surface may be positioned adjacent the light source and the opposite edge may be positioned adjacent the illuminated scan area so that the first curved reflecting surface extends from the light source to about the illuminated scan area. The second curved reflecting surface may be positioned in opposed spaced-apart non-parallel relation to the first curved reflecting surface such that the distance separating the reflecting surfaces at the light source is less than the distance separating the reflecting surfaces at the end adjacent the illuminated scanning area. An elongate planar reflecting surface may be positioned adjacent the second curved reflecting surface so that it is substantially perpendicular to the illuminated scan area. Some of the light rays from the light source are reflected by the first curved reflecting surface and the second curved reflecting surface onto the planar reflecting surface, which in turn reflects the light rays onto the illuminated scan area so that they are incident on the illuminated scan area at substantially oblique angles. Other light rays from the light source are directly reflected by either the first curved reflecting surface, the second curved reflecting surface, or by a combination of the two, onto the illuminated scan area so that they are also incident on the illuminated scan area at substantially oblique angles.

BRIEF DESCRIPTION OF THE DRAWING

The accompanying drawing, which is incorporated herein and forms a part of the specification illustrates preferred embodiments of the present invention, and together with the description, serves to explain the principles of the invention. In the drawing.

DETAILED DESCRIPTION OF THE INVENTION

Figure 1:
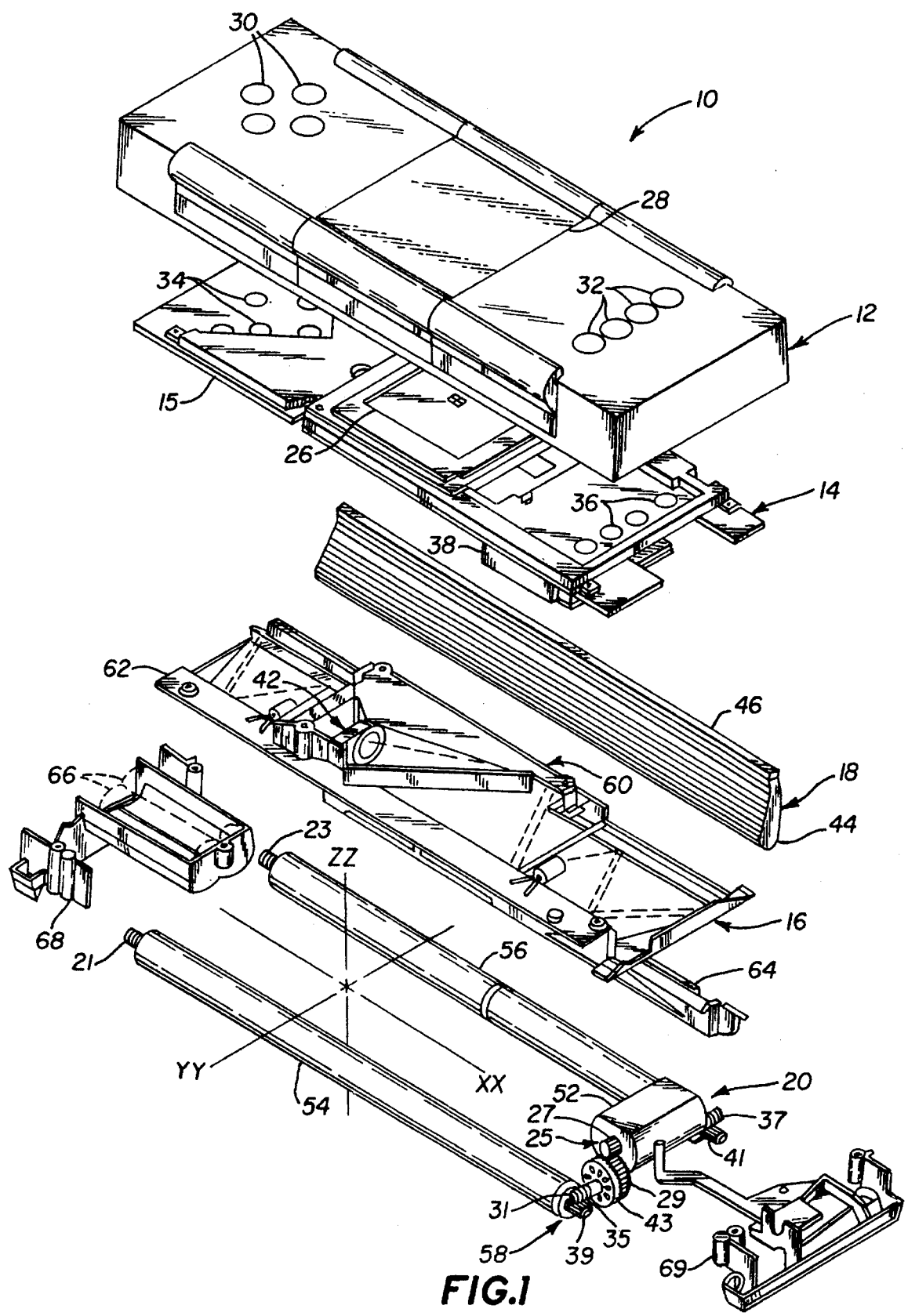
FIG. 1 is an exploded perspective view of a hand scanner showing arrangement and configuration of the electronic circuit board assembly, mirror assembly, light pipe assembly, and motor and drive roller assembly.
Figure 6:
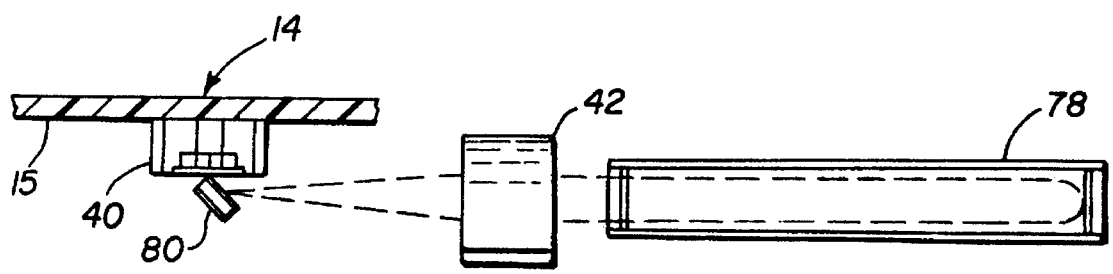
FIG. 6 is a side view in elevation of the lens assembly and a portion of the mirror assembly showing their orientation with respect to the linear photosensor array.

One embodiment of a hand scanner 10 is best seen in FIG. 1 and includes a housing assembly 12 to which are mounted a variety of subassemblies, including an electronic circuit board assembly 14, a mirror assembly 16, an optical wave guide assembly 18, and a motor and drive roller assembly 20. The electronic circuit board assembly 14 includes the various electronic components required for the operation of the hand scanner 10, including a microprocessor and associated random access memory (RAM) (not shown), as well as a linear photosensor or detector array 40, such as a CCD, mounted to the underside 15 of electronic circuit board assembly 14, as best seen in FIG. 6. Electronic circuit board assembly 14 also includes a display 26, such as a liquid crystal display, that is visible through window 28 in housing assembly 12 for displaying data relating to the function and operation of the scanner 10. Electronic circuit board assembly 14 also includes a mass data storage device 38, such as a magnetic hard disk, capable of storing data from the linear photosensor array 40.

The mirror assembly 16 defines the path taken by light reflected from the illuminated scanning area to the linear photosensor or detector array 40. Briefly, mirror assembly 16 includes a rigid support chassis 62 to which are mounted a variety of mirrors and a lens assembly 42. The mirrors mounted to support chassis 62 direct light from the illuminated scanning area 48 on object O (shown in FIG. 5) to the lens assembly 42, which forms an image of the illuminated scanning area (i.e., the scan line) 48 on the linear photosensor array 40, as best seen in FIG. 6.

Figure 2:
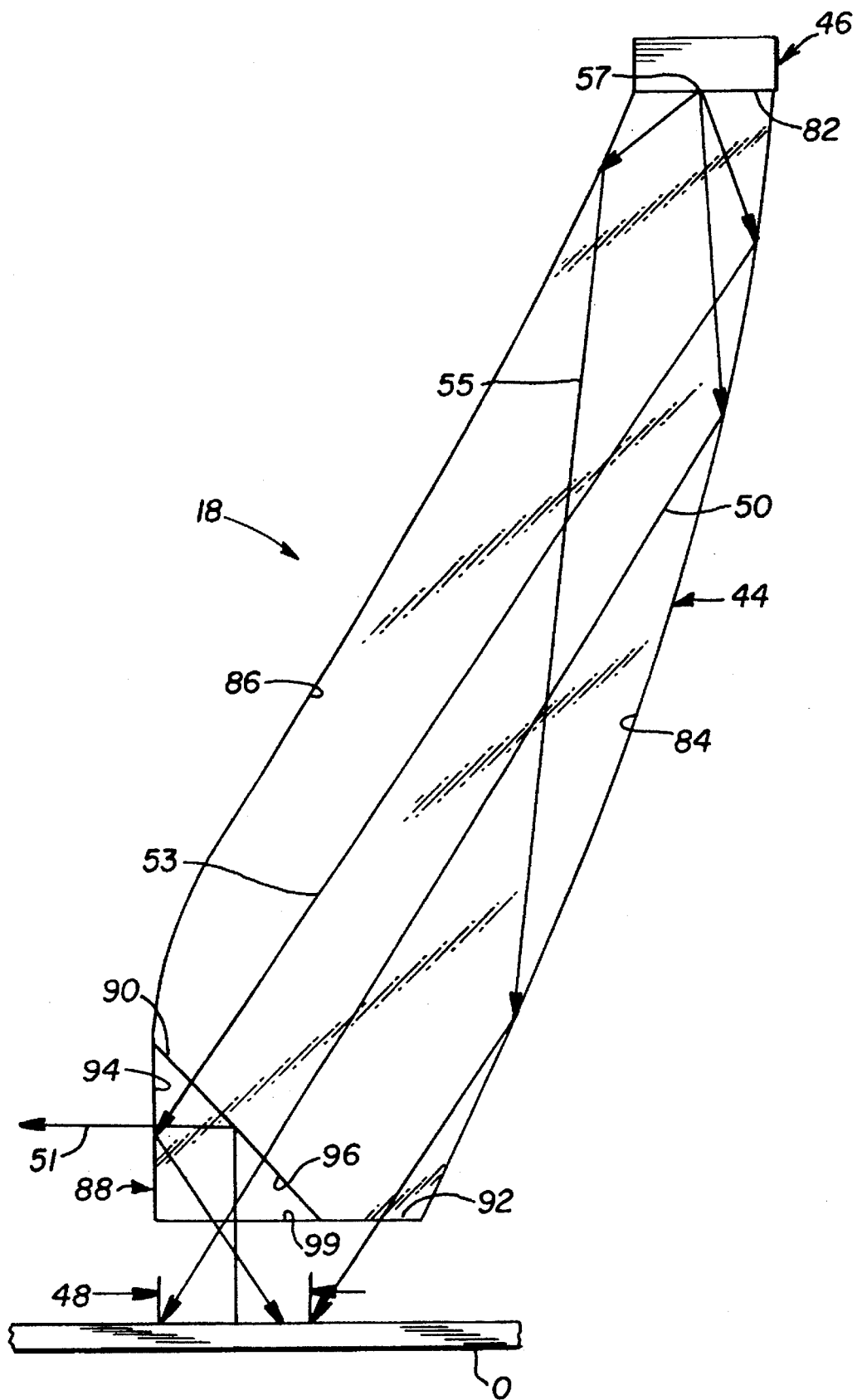
FIG. 2 is a side view in elevation of the light pipe assembly of FIG. 1 more clearly showing how light from the light source is collected and directed to the scanning area.

Referring now to FIG. 2, optical wave guide assembly 18 includes an elongate light pipe 44 that collects a plurality of light rays, such as rays 50, 53, and 55, from elongate light source 46 and directs them onto the scanning area 48. Optical wave guide assembly 18 is configured so that substantially all of the light rays from light source 46 are incident on the scanning area 48 at oblique angles (i.e., angles other than 90°), thus substantially reducing specular reflections and increasing scanning accuracy.

The motor and drive roller assembly 20 is best seen in FIG. 1 and includes a motor 52 for driving a pair of elongate drive rollers 54 and 56 to assist the operator in moving the hand scanner 10 across the object being scanned. As will be described in greater detail below, the motor and drive roller assembly 20 includes an irreversible or "oneway" worm drive assembly 58 that allows the motor 52 to drive the rollers 54 and 56, but does not allow the rollers to drive (i.e., overrun) the motor. Consequently, the worm drive assembly 58 prevents the operator from rolling the scanner at speeds greater than the speed at which the motor is driving the rollers.

To initiate scanning, the operator would place the hand scanner 10 over the object 0 being scanned (FIG. 5), such as a piece of paper or a book, and depress the scan on/off switch 64, which may be incorporated in housing assembly 12, as shown in FIG. 1, or which may be incorporated into a roller suspension system (not shown) such that the scanner 10 is enabled for scanning by the application of downward force to the scanner by the operator. At that point, the microprocessor (not shown) would actuate the motor and drive roller assembly 20 to begin turning the rollers 54, 56, thus assisting the operator in accelerating the scanner 10 to a speed near the optimum scanning speed. Since worm drive assembly 58 prevents the scanner from overrunning the motor 52, it is not possible for the operator to non-slippingly roll the hand scanner 10 at a speed faster than it is being rolled by the motor 52. Worm drive assembly 58 therefore provides effective control of maximum scanning speed. As the hand scanner 10 is being rolled across the object O, data from the linear photosensor array 40 are collected and stored on the hard disk 38, which data may then be later downloaded to a suitable device (not shown) for subsequent processing or display.

A significant advantage of the hand scanner embodiment 10 is that the combination of the electronic circuit board assembly 14, mirror assembly 16, optical wave guide assembly 18, and motor and drive roller assembly 20 all cooperate together to provide a compact, efficient hand scanner having the difficult to achieve combination of excellent scanning performance, compact size, and long battery life. For example, the optical wave guide assembly 18 provides excellent illumination of the scanning area 48 by effectively capturing and directing onto the scanning area 48 a substantial portion of the light rays from the elongate light source 46. Consequently, the optical wave guide assembly 18 allows a lower intensity, thus lower power, light source 46 to be used. Moreover, since the light pipe 44 of optical wave guide assembly 18 allows the elongate light source 46 to be located a substantial distance from the object being scanned, intensity variations along the length of the illuminated scanning area 48 (i.e., along an axis parallel to axis XX) are significantly reduced, which improves scanning performance and again allows a lower intensity light source to be used. The light pipe 44 also achieves excellent illumination uniformity along the width of the illuminated scanning area 48 (i.e., along an axis parallel to axis YY), which also improves scanning performance. Another advantage of the optical wave guide assembly 18 is that it illuminates the scanning area 48 with light rays that are incident at substantially oblique angles, thereby significantly reducing scanning errors resulting from specular reflections.

Other advantages result from the implementation of mirror assembly 16. For example, the folded optical path achieved by the multiple mirror configuration allows a relatively long focal length lens assembly 42 to be used, thus increasing depth of field while simultaneously reducing the length of the linear photosensor array 40. Another advantage is that mirror assembly 16 may be aligned and focused solely by adjusting the position of prismic mirror assembly 60, which allows the other components to be fixedly mounted to the support chassis 62, thus increasing reliability and reducing cost. Of course, the implementation of mirror assembly 16 also does away with the need to utilize expensive contact image sensors, with all their associated disadvantages.

The details of the hand scanner 10 are best seen by referring to FIG. 1. As was briefly described above, housing assembly 12 forms a protective cover for electronic circuit board assembly 14, mirror assembly 16, optical wave guide assembly 18, and motor and drive roller assembly 20. Electrical power to operate the scanner 10 may be provided by batteries 66 (shown in phantom) mounted in support block assembly 68.

Electronic circuit board assembly 14 includes the various electronic components required to collect and process data from the linear photosensor array 40 and to control the overall function and operation of the hand scanner 10. Specifically, electronic circuit board assembly 14 includes a conventional microprocessor and associated random access memory (RAM) (not shown), as well as linear photosensor array (CCD) 40 mounted to the underside 15 of electronic circuit board assembly 14, as best seen in FIG. 6. A plurality of cursor buttons 30 and function buttons 32 in housing assembly 12 operate corresponding cursor switches 34 and function switches 36 on circuit board assembly 14 to control the various functions and operations of the hand scanner 10. A liquid crystal display 26, visible through window 28 in housing 12, displays data relating to the function and operation of the scanner 10. Electronic circuit board assembly 14 also includes a magnetic hard disk 38 for storing data from the linear photosensor array 40.

The optical wave guide assembly 18 is best seen in FIG. 2 and comprises an elongate light pipe 44 and a prism 88 for directing light rays, such as rays 50, 53, and 55, from elongate light source 46 to a scanning area 48. As was briefly mentioned above, light pipe 44 and prism 88 are configured so that the light rays, such as rays 50, 53, and 55, are incident on the scanning area 48 at substantially oblique angles (i.e., angles other than 90°) to reduce scanning errors resulting from specular reflections. As will be described in greater detail below, prism 88 also directs reflected light 51 from the illuminated scanning area 48 to the linear photosensor array 40 via mirror assembly 16.

Light pipe 44 may comprise a concave reflective surface 84 and a convexoconcave reflective surface 86 (i.e., a surface having both a convex portion and a concave portion) positioned in opposed, spaced-apart relation. The reflective surfaces 84 and 86 are also arranged so that the distance between them increases from the light source 46 to the scanning area 48. An entrance window 82 is defined between reflective surfaces 84 and 86, adjacent light source 46, while a slanted exit window 90 is defined adjacent prism 88. Light pipe 44 also includes a small extended window 92 that is substantially parallel to the scanning area 48.

Prism 88 may comprise a first face 94, a second face 96, and a third face 99 and, in conjunction with light pipe 44, allows the scanning area 48 to be illuminated by light rays that are incident at oblique angles. Prism 88 also tends to prevent unwanted or spurious light rays (not shown) from the illuminated scanning area 48 from reaching the detector 40. Put in other words, prism 88 directs only the useful light rays 51 from the illuminated scanning area 48 toward mirror assembly 16, and ultimately to detector 40. Other light rays that are not particularly useful to the detector 40, such as light rays (not shown) resulting from minor specular reflections or other spurious light rays, are reflected by prism 88 in directions that are not parallel to the direction of the useful rays 51. Consequently, such unwanted or spurious light rays will not be reflected by mirror assembly 16 onto the surface of detector 40. Prism 88 therefore serves as a filter to help prevent unwanted light rays from being focused on the detector 40, which tends to reduce scanning errors.

In one preferred embodiment, prism 88 may comprise a right triangular prism, in which case the first face 94 is a vertical face generally perpendicular to the plane containing the illuminated scanning area 48. The third face 99 of prism 88 is a horizontal face generally parallel to the plane of the illuminated scanning area 48, while the second face 96 is a hypotenuse face connecting the first or vertical face 94 and the third or horizontal face 99. The useful light rays 51 reflected from the object O in the illuminated scanning area 48 are then reflected from hypotenuse face 96 of prism 88 toward mirror 70 by means of total internal reflection. It should be noted that while the prism 88 shown and described herein is a right triangular prism, it need not be and could instead comprise a prism wherein the angle between the first face 94 and third face 99 is not exactly 90°.

In one preferred embodiment, light pipe 44 and prism 88 may be manufactured from any suitable transparent material having an index of refraction greater than that of air. For example, light pipe 44 and prism 88 may be made from a transparent polycarbonate plastic material. If so, the transparent plastic material should be substantially free of voids or "bubbles" to minimize internal light scattering, which could seriously affect the performance of the respective components. As is well-known, light incident on the inside surfaces of such materials will be reflected by means of total internal reflection if the light is incident on the inside surfaces at an angle greater than the critical angle for that particular material. Light pipe 44 and prism 88 therefore provide an efficient means to collect and guide the light rays, such as rays 50, 53, and 55, from light source 46 toward the scanning area 48. Finally, it is important that hypotenuse face 96 of prism 88 merely be placed adjacent slanted exit window 90 of light pipe 44, and not cemented or otherwise bonded to exit window 90, so that light rays 51 from the illuminated scanning area 48 will be reflected from hypotenuse face 96 by means of total internal reflection. Alternatively, the various reflective surfaces 84, 86, and 94 of the respective light pipe 44 and prism 88 need not comprise internal reflective surfaces, i.e., surfaces for reflecting light by means of total internal reflection, but could also comprise any type of surface, such as a mirrored reflective surface, capable of reflecting light in the manner described above.

In one preferred embodiment, the shapes and divergent spacing of concave reflective surface 84 and convexoconcave reflective surface 86 are such that a substantial portion of the light rays, such as rays 50, 53, and 55, from light source 46 are reflected by means of total internal reflection from surfaces 84, 86, and vertical face 94 of prism 88 so that they are incident on scanning area 48 at oblique angles (i.e., angles other than 90°). For example, one light ray 50 from a point 57 on light source 46 is reflected by concave reflective surface 84, through the slanted exit window 90, hypotenuse face 96 of prism 88, and onto the scanning area 48. Another light ray 53 from point 57 is reflected by concave reflective surface 84 onto vertical face 94 of prism 88 where it is also reflected by means of total internal reflection onto scanning area 48 at an oblique angle. A third light ray 55 is reflected by convexoconcave reflective surface 86 onto concave reflective surface 84, and through extended window 92, where it is also incident on scanning area 48 at an oblique angle.

To reduce specular reflections, it is preferred that the light rays, such as rays 50, 53, and 55, exiting prism 88 and extended window 92 be incident on the scanning area 48 at angles that are less than about 85° with respect to the plane of scanning area 48. For example, light rays that are incident on the scanning area 48 at angles in the range of about 40° to 85° provide excellent results. In one preferred embodiment, the light rays are incident on the scanning area 48 at angles in the range of about 40° to about 73°. While not shown in FIG. 2, it should be noted that the light rays, such as light rays 50, 53, and 55, will be bent somewhat by refraction upon exiting light pipe 44 and prism 88 in accordance with well-known principles of refraction and as would be obvious to persons having ordinary skill in the art.

The optical wave guide assembly 18 may be optimized for the particular installation by using one of the many commercially available ray tracing computer programs (e.g., OSLO, available from Sinclair Optical of Rochester, N.Y.) to model the light pipe assembly 18, and thus fine tune the shapes of the surfaces 84 and 86 for the particular installation. In the preferred embodiment described above, a ray tracing computer program was used to optimize the curvatures of concave reflecting surface 84 and convexoconcave reflecting surface 86 so that the light rays illuminating the scanning area 48 would be incident at angles less than about 85° with respect to the plane of the scanning area 48. The reflecting surfaces 84 and 86 can also be optimized to provide substantially equal intensity of illumination across the scanning area 48 in the YY direction, and maximize the total illumination of the scanning area 48.

As was briefly described above, elongate light source 46 may comprise any of a wide variety of devices capable of producing light at suitable intensities along the entire length of the scanning area, such as a fluorescent tube or an array of light emitting diodes (LEDs). In the preferred embodiment, elongate light source 46 comprises an array of LEDs that are mounted to the back surface 15 of electronic circuit board assembly 14, so that they are adjacent the entrance window 82 of light pipe 44. Alternatively, light source 46 may be independently mounted adjacent entrance window 82.

Figure 3:
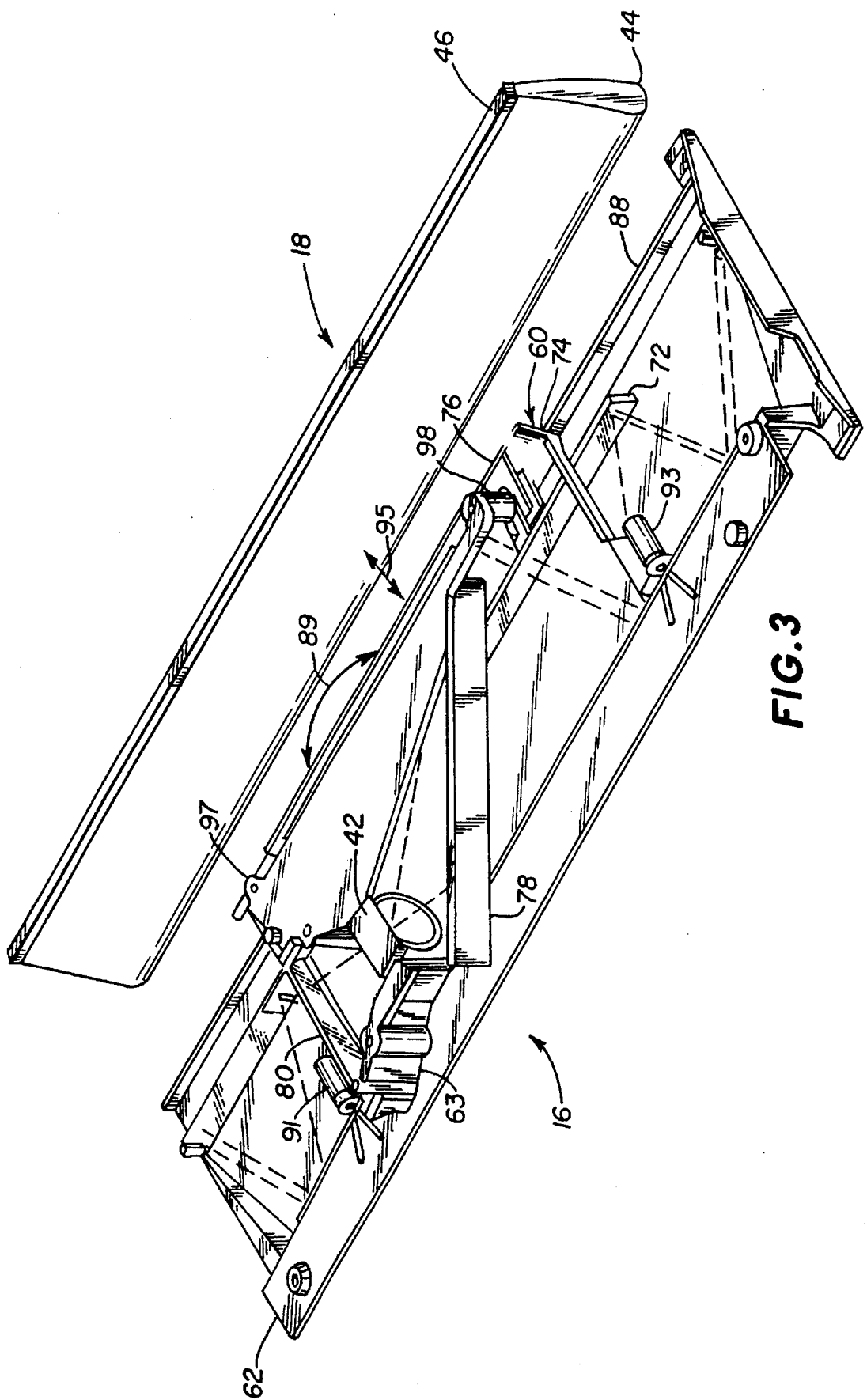
FIG. 3 is a left hand exploded perspective view of the mirror and light pipe assemblies according to the present invention.
Figure 4:
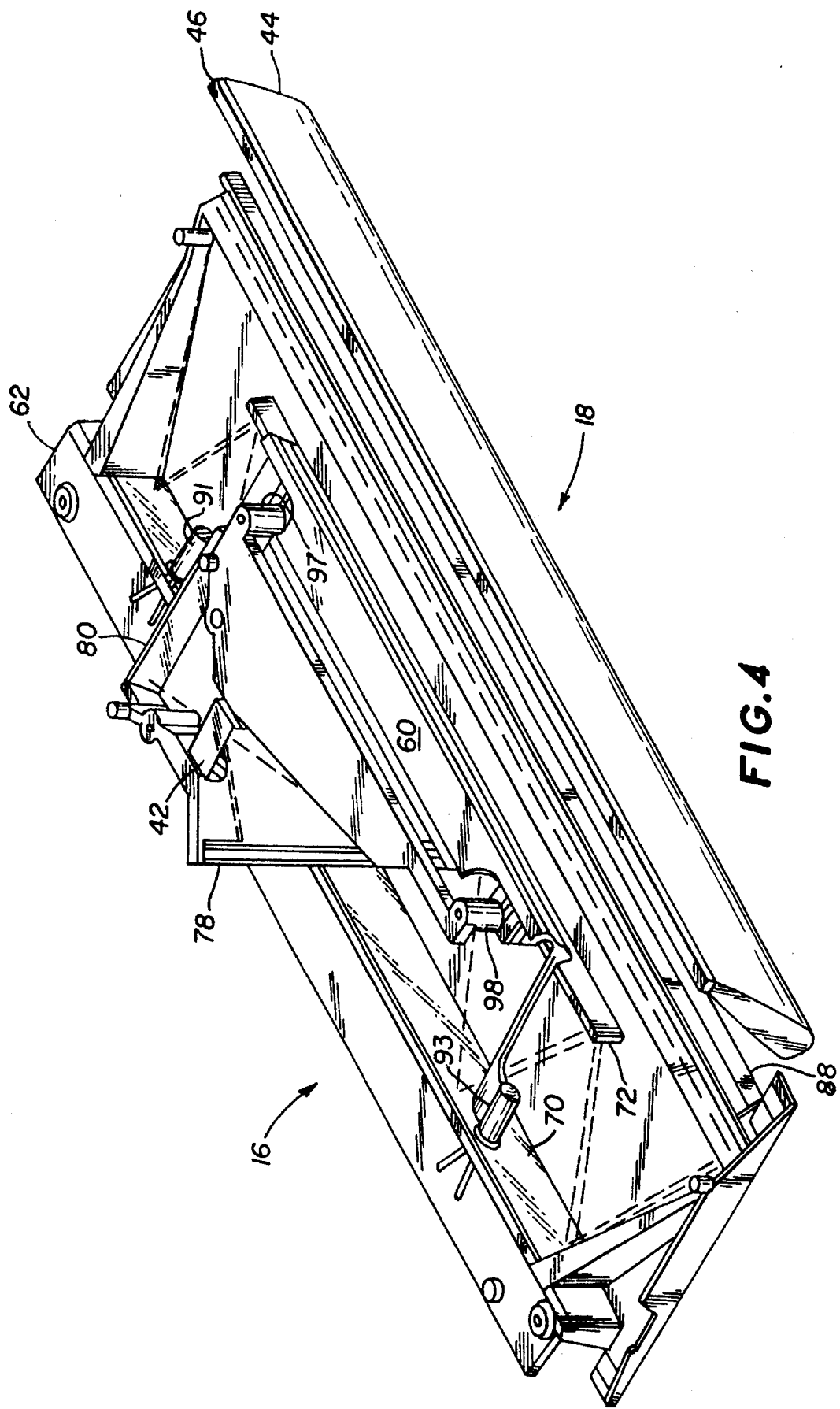
FIG. 4 is a right hand exploded perspective view of the mirror and light pipe assemblies according to the present invention.

The details of the mirror assembly 16 are best seen by referring to FIGS. 3–6 simultaneously. Essentially, mirror assembly 16 comprises a rigid support chassis 62 to which are mounted a plurality of mirrors 70, 72, 74, 76, 78, and 80, as well as a lens assembly 42. In one preferred embodiment, lens assembly 42 may be mounted to a lens chassis 63 that is in turn mounted to support chassis 62. See FIGS. 1, 3, and 4. Opposed mirrors 70 and 72 extend in a common direction generally parallel to central longitudinal axis XX (FIG. 1) and together comprise a multiple reflecting mirror assembly to "fold" the relatively long light path into a smaller volume by reflecting the light from the illuminated scanning area 48 along a plurality of light path segments, as will be described below. Mirrors 74 and 76 also extend in a direction generally parallel to axis XX and together comprise a V-shaped "prismic" mirror assembly 60 that is adjustably mounted to support chassis 62 and lens chassis 63. As will also be described in greater detail below, prismic mirror assembly 60 can be moved along several axes to change the length and direction of the folded light path, thus allowing the image of the illuminated scanning area 48 to be aligned and focused on the linear photosensor detector array 40. Mirror 78 extends obliquely to the common directions of mirrors 70, 72, 74, and 76, and directs light from the prismic mirror assembly 60 to lens assembly 42, as best seen in FIGS. 3, 4, and 6. Planar mirror 80 extends in a direction generally parallel to central lateral axis YY (FIG. 1) and directs light from the lens assembly 42 onto the linear photosensor array 40, as best seen in FIG. 6. Support chassis 62 and lens support chassis 63 can be made from a wide variety of materials that can be readily molded into complex shapes, yet provide a fairly rigid and stable structure. In the preferred embodiment, support chassis 62 and 63 are made from a polycarbonate plastic material.

Figure 5:
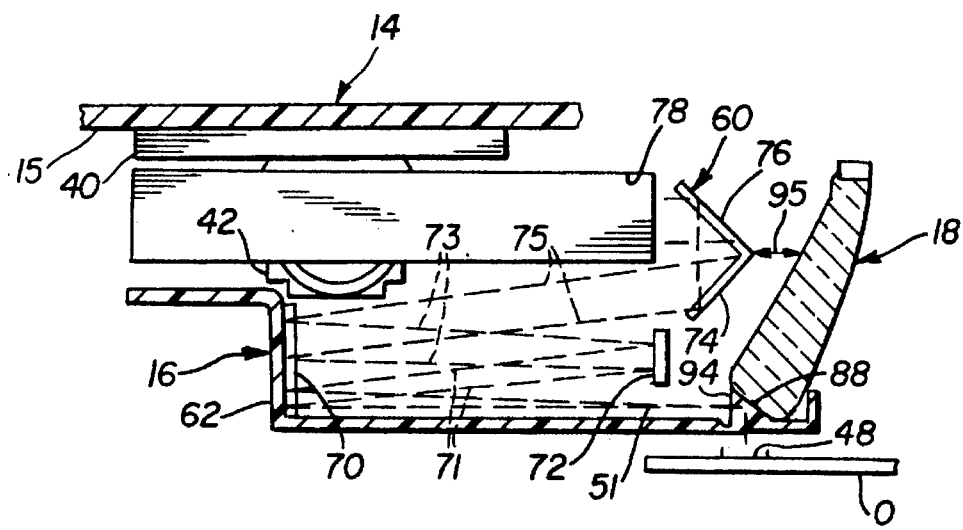
FIG. 5 is a cross section view in elevation of the mirror assembly, light pipe assembly, and electronic circuit board assembly showing their respective positions and orientations.

As was briefly described above, mirrors 74 and 76 are mounted at about right angles with respect to one another to form V-shaped prismic mirror assembly 60 that extends along an axis that is generally parallel to central longitudinal axis XX. Prismic mirror assembly 60 is so named because it acts like a prism that returns internally reflected light along an axis that is parallel to the incident light. However, the prismic mirror assembly 60 in one preferred embodiment differs from an ideal prism in that the angle between the two reflecting surfaces is not exactly 90°. Instead, the two mirrors 74 and 76 are mounted at an angle of about 91.5°, so that light from the third light path 75 (FIG. 5) can be directed along a path that is not parallel to the third light path 75 to mirror 78, as best seen in FIG. 5. Put in other words, the prismic mirror assembly 60 reflects light along an axis that is not quite parallel to the axis of the incident light. Whether the angle between the two mirrors 74 and 76 is selected to be 90° or some other angle will depend on the particular arrangement of the other reflecting mirrors, such as mirrors 70, 72, and 78, and the need to intercept light from the third light path 75 and reflect it to mirror 78.

It should also be noted that while the prismic mirror assembly 60 may comprise two planar reflecting surfaces, such as mirrors 74 and 76, as shown and described herein, prismic mirror assembly 60 may comprise a conventional prism having internal reflecting surfaces positioned at the appropriate angle, such as an angle of about 91.5°.

Prismic mirror assembly 60 may be mounted to support chassis 62 by adjustable screw assemblies 91 and 93 and to lens support chassis 63 by adjustable screw assemblies 97 and 98, as best seen in FIGS. 3 and 4. These four adjustable screw assemblies 91, 93, 97, and 98, allow the prismic mirror assembly 60 to be moved in a variety of directions to align and focus the image of the illuminated scanning area 48 (i.e., the image of the scan line) onto the surface of detector 40. For example, the image of the illuminated scanning area 48 on the surface of the detector 40 can be moved along an axis generally parallel to the axis XX (FIG. 1) by moving prismic mirror assembly 60 in a direction parallel to vertical axis ZZ (FIG. 1). In one preferred embodiment, prismic mirror assembly 60 may be moved in such a direction by adjusting the screw assemblies 97 and 98 by equal amounts in the same direction. Similarly, the image of the scan line on the surface of the detector 40 can be rotated about an axis parallel to vertical axis ZZ by rotating the prismic mirror assembly 60 about an axis generally parallel to central lateral axis YY. In one preferred embodiment, this can be accomplished by adjusting the screw assemblies 97 and 98 by different amounts or in different directions. Screw assemblies 97 and 98 therefore allow the image of the scan line to be precisely aligned on the surface of the detector 40.

The differential focus, i.e., the focus of the image from one end of the detector 40 to the other, can be changed by rotating the prismic mirror assembly 60 about an axis generally parallel to vertical axis ZZ, i.e., in the direction of arrow 89 (FIG. 3). Such movement of prismic mirror assembly 60 also has the effect of moving the image along an axis generally parallel to axis YY (FIG. 1). In one preferred embodiment, the prismic mirror assembly 60 can be rotated about an axis generally parallel to vertical axis ZZ by adjusting the screw assemblies 91 and 93 by different amounts or in different directions.

The overall focus of the image of the scan line 48 on the surface of the detector 40 can be changed by moving prismic mirror assembly 60 along an axis generally parallel to central lateral axis YY, i.e., in the direction of arrow 95 (FIG. 5). In one preferred embodiment, this can be accomplished by adjusting the screw assemblies 91 and 93 by equal amounts in the same direction.

Screw assemblies 91, 93, 97, and 98 thus provide a convenient means to change the position of prismic mirror assembly 60 so that the image of the illuminated scanning area 48 can be precisely aligned and focused on the surface of the linear photosensor array 40.

The light path taken by the useful light rays 51 reflected from the illuminated scanning area 48 to linear photosensor array 40 is best seen in FIG. 5. Light rays 51 exiting vertical face 94 of prism 88 are first directed to planar reflective mirror 70 which, together with opposed planar reflective mirror 72, forms a multiple reflecting assembly to reflect the light rays 51 along a light path having a plurality of segments, such as segments 71, 73, and 75, thus "folding" the relatively long light path between the lens assembly 42 and illuminated scanning area 48 into the relatively small volume available in the hand scanner 10. Specifically, the light rays 51 incident on the lower portion of mirror 70 are reflected along a first light path segment 71 toward mirror 72. Mirror 72 in turn reflects the light rays along a second light path segment 73 back towards mirror 70. After being reflected off of the upper portion of mirror 70, the light rays 51 are reflected along a third light path segment 75 towards prismic mirror assembly 60. At prismic mirror assembly 60, the light rays 51 are first reflected by mirror 74 onto mirror 76 and then reflected by mirror 76 onto mirror 78, as best seen in FIGS. 3, 4, and 6. The light rays 51 reflected by mirror 78 then pass through lens assembly 42, which focuses the light onto the linear photosensor array 40 via mirror 80, as best seen in FIG. 6.

To achieve a large depth of field, it is desirable to provide a relatively long focal length optical system. In the preferred embodiment, lens assembly 42 is designed so that the length of the light path between the lens assembly 42 and the illuminated scanning area 48 is in the range of about 200 mm, while the length of the light path between the lens assembly 42 and linear photodetector array 40 is about 25 mm. As mentioned above, the folded light path between the lens assembly 42 and the illuminated scanning area 48 allows the relatively long (200 mm) light path between lens assembly 42 and illuminated scanning area 48 to be more easily accommodated within the limited volume available within housing 12. Housing 12 may for example have a length, width, and height of 240 mm, 80 mm, and 35 mm, respectively, and still provide a 200 mm light path as described above.

Referring back now to FIG. 1, the motor and drive roller assembly 20 includes a pair of elongate roller shafts 21, 23 journaled in opposed support block assemblies 68 and 69 so that they extend parallel to central longitudinal axis XX of the scanner. Rollers 54 and 56 are attached to roller shafts 21, 23 so as to rotate therewith. The rollers 54 and 56 may be constructed from rubber, plastic, or any other material having a coefficient of friction sufficient to frictionally engage the surface of a paper document during scanning displacement under normal operating conditions.

A motor 52 is mounted within housing 12, preferably within support block assembly 69, so that its output shaft 25 is arranged substantially parallel to central lateral axis YY. A pinion gear 27 mounted to output shaft 25 engages a gear 29 attached to a laterally disposed worm shaft 31 journaled in support block assembly 69 and forms a transmission to increase the amount of torque applied to the worm drive assembly 58. Worm drive assembly 58 includes a pair of worms 35, 37 that are fixedly mounted on opposite ends of worm shaft 31 so that they engage respective worm gears 39, 41 fixedly mounted on roller shafts 21, 23, respectively. Roller shafts 21 and 23 are thus rotated by the motor 52 in the same direction and at identical angular velocities which are directly proportional to the angular velocity of motor output shaft 25. The motor and drive roller assembly 20 also includes an encoder assembly 43 operably associated with worm shaft 31 or another shaft, such as output shaft 25 or roller shafts 21 or 23, for providing a pulsed encoder output signal to the microprocessor (not shown) that is representative of the displacement of the scanner 10.

The motor and drive roller assembly 20, being a "one-way" power transfer device, substantially prevents rollers 54 and 56 from being driven faster than the speed at which the motor 52 is driving the rollers. Consequently, motor and drive roller assembly 20 provides mechanical regulation of the maximum speed at which the scanner can be moved by the operator, thus eliminating the need for the motor 52 to apply reverse torque to the roller assembly and further reducing the electrical load on battery 66.

Since many different types of motor control systems have been developed for hand scanner applications (see, for example, the motor control system shown and described in U.S. patent application Ser. No. 08/271,404, Hand Held Optical Scanner With Speed Control of McConica, et al., identified above and incorporated herein by reference), the specific motor control circuit used in the scanner 10 will not be described in great detail herein. However, for the purposes of providing a general background, the control system used with the motor and drive roller assembly 20 actuates drive motor 52 to apply an accelerating torque to the motor and drive roller assembly 20 whenever the drive rollers are being moved at a speed below the predetermined optimal range of scanning speed. Then, once the scanner is moving at a speed within the predetermined optimal speed range, the torque output of motor 52 is varied as necessary to ensure that the scanner speed remains within the predetermined optimal speed range. Motor 52 is never actuated to apply a reverse torque to the motor and drive roller assembly 20, since the motor and drive roller assembly essentially prevents the rollers 54 and 56 from overrunning motor 52.

The amount of torque applied by the motor 52 to the motor and drive roller assembly 20 is based on a comparison of the current value of scanner velocity and acceleration to a predetermined optimal speed range. The optimal speed range is a relatively small speed range which encompasses a target speed that is slightly less than the maximum speed at which the scanner can operate based upon the sampling rate of the photoelectric conversion device. In the preferred embodiment, the target speed may be 90% of the maximum speed and the optimal speed range may extend from about 80% of maximum speed to about 99% of maximum speed.

This completes the detailed description of the optical wave guide for the hand-held scanner according to one embodiment of the present invention. While a number of specific materials were described above for the various embodiments of this invention, persons having ordinary skill in the art will recognize that other substitute materials or combinations of materials may be available now or in the future to accomplish comparable functions to the optical wave guide according to the present invention. For example, while the light pipe and prism assembly shown and described herein are made from a transparent polycarbonate plastic, other transparent materials, such as acrylic, or even glass, could be substituted for the polycarbonate material shown and described herein. Likewise, the precise shape and spacing of the curved reflecting surfaces of the light pipe assembly may be varied depending on the size and layout of the particular application in which it is to be used, and the selection and provision of such other shapes and spacings for the curved reflecting surfaces of the light pipe assembly would be obvious to persons having ordinary skill in the art after having become familiar with the above teachings.

It is contemplated that the inventive concepts herein described may be variously otherwise embodied and it is intended that the appended claims be construed to include alternative embodiments of the invention except insofar as limited by the prior art.

What is claimed is:

1. An optical assembly for illuminating a scanning area lying in a scan plane, comprising:

a light source positioned in spaced apart relation from the scanning area; and optical wave guide means positioned between said light source and the scanning area for collecting light rays from said light source and directing them onto the scanning area at substantially oblique angles;

wherein said optical waveguide comprises first curved reflecting means extending from about the light source to about the illuminated scan area for reflecting light rays and second curved reflecting means positioned in opposed spaced-apart non-parallel relation to said first curved reflecting means for reflecting light rays; and planar reflecting means positioned adjacent said second curved reflecting means and in opposed relation to said first curved reflecting means, so that said planar reflecting means is substantially perpendicular to the scan area, for reflecting some of the light rays reflected from said first curved reflecting means and said second curved reflecting means onto the illuminated scan area so that they are incident on the illuminated scan area at substantially oblique angles, and others of the light rays reflected from said first curved reflecting means and second curved reflecting means are also incident on the illuminated scan area at substantially oblique angles.

2. The optical assembly of claim 1, wherein said first curved reflecting means and said second curved reflecting means comprise respective first and second inside surfaces of a light pipe, whereby the light rays are reflected by the respective inside surfaces by means of total internal reflection.

3. An optical wave guide for directing a plurality of light rays from an elongate light source to an illuminated scan area, the illuminated scan area lying in a scan plane, comprising:

first curved reflecting means extending from about the light source to about the illuminated scan area for reflecting light rays;

second curved reflecting means positioned in opposed spaced-apart non-parallel relation to said first curved reflecting means for reflecting light rays; and planar reflecting means positioned adjacent said second curved reflecting means and in opposed relation to said first curved reflecting means, so that said planar reflecting means is also substantially perpendicular to the scan plane, for reflecting some of the light rays reflected from said first curved reflecting means and said second curved reflecting means onto the illuminated scan area so that they are incident on the illuminated scan area at substantially oblique angles, and whereby others of the light rays reflected from said first curved reflecting means and said second curved reflecting means are also incident on the illuminated scan area at substantially oblique angles.

4. The optical wave guide of claim 3, wherein said first curved reflecting means is concave.

5. The optical wave guide of claim 4, wherein said second curved reflecting means is convexoconcave.

6. The optical wave guide of claim 5, wherein said first curved reflecting means and said second curved reflecting means comprise respective first and second inside surfaces of a light pipe, whereby the light rays are reflected by the respective inside surfaces by means of total internal reflection.

7. The optical wave guide of claim 6, wherein said planar reflecting means comprises a prism.

8. An optical wave guide for directing a plurality of light rays from an elongate light source to an illuminated scan area, the elongate light source being aligned along a light source axis and the illuminated scan area lying in a scan plane, comprising:

a first elongate curved reflecting surface having a first edge positioned adjacent the elongate light source and substantially parallel to the light source axis and a second edge positioned about at the illuminated scan area and substantially parallel to the scan plane so that said first elongate curved reflecting surface extends from about the light source to about the illuminated scan area;

a second elongate curved reflecting surface having a first edge positioned adjacent the elongate light source in parallel, spaced-apart relation to the first edge of said first elongate curved reflecting surface, and a second edge positioned above the illuminated scan area in parallel, spaced-apart relation to the scan plane, said second elongate curved reflecting surface being positioned in opposed spaced-apart relation to said first elongate curved reflecting surface so that a first distance between the first edge of said first elongate curved reflecting surface and the first edge of said second elongate curved reflecting surface is less than a second distance between the second edge of said first elongate curved reflecting surface and the second edge of said second elongate curved reflecting surface; and an elongate planar reflecting surface having a first edge positioned at about the second edge of said second elongate curved reflecting surface and a second edge positioned at about the illuminated scan area in parallel, spaced-apart relation to the second edge of said first elongate curved reflecting surface so that said elongate planar reflecting surface is substantially perpendicular to the scan plane, whereby some of the light rays reflected from said first elongate curved reflecting surface and said second elongate curved reflecting surface are reflected by said planar reflecting surface onto the illuminated scan area such that they are incident on the illuminated scan area at substantially oblique angles and whereby others of the light rays reflected from said first elongate curved reflecting surface and said second elongate curved reflecting surface are incident on the illuminated scan area at substantially oblique angles.

9. The optical wave guide of claim 8, wherein said first elongate curved reflecting surface is concave.

10. The optical wave guide of claim 9, wherein said second elongate curved reflecting surface is convexoconcave.

11. The optical wave guide of claim 10, wherein said first elongate curved reflecting surface and said second elongate curved reflecting surface comprise respective first and second inside surfaces of a light pipe, whereby the light rays are reflected by the respective first and second inside surfaces by means of total internal reflection.

12. The optical wave guide of claim 11, wherein said elongate planar reflecting surface comprises a prism.

13. An optical assembly for directing a plurality of light rays from an elongate light source to an illuminated scan area, comprising:

a light pipe having first and second non-parallel opposing curved inside surfaces separated at one end by an elongate entrance surface and at another end by an elongate exit surface, the elongate entrance surface being adjacent the elongate light source; and an elongate triangular prism having a first side, a second side, and a third side, the third side being adjacent the elongate exit surface of said light pipe and the second side of said triangular prism being adjacent the illuminated scan area, whereby said first and second non-parallel opposing curved inside surfaces of said light pipe and said triangular prism are adapted so that light rays exiting the second surface of said triangular prism are incident on the illuminated scan area at substantially oblique angles.

14. The optical assembly of claim 13, wherein said first curved inside surface is concave.

15. The optical assembly of claim 14, wherein said second curved inside surface is convexoconcave.

16. The optical assembly of claim 15, wherein said light pipe comprises transparent plastic.

17. The optical assembly of claim 16, wherein said elongate triangular prism comprises transparent plastic.

18. A method for directing a plurality of light rays form an elongate light source to an illuminated scan area, comprising the steps of:

providing an optical waveguide having first and second curved reflecting surfaces, wherein said first reflecting surface extends from about the light source to about the illuminated scan area and wherein said second reflecting surface is positioned in opposed spaced-apart non-parallel relation to said first curved surface;

collecting light rays from the elongate light source;

reflecting said collected light rays from said first and second curved reflecting surfaces such that reflected light rays are incident on the illuminated scan area at substantially oblique angles;

positioning a planar reflecting surface adjacent said second curved reflecting surface and in opposed relation to said first curved reflecting surface, so that said planar reflecting surface is substantially perpendicular to the scan area; and reflecting some of the collected light rays reflected from said first and second curved reflecting surfaces from said planar reflecting surface onto the illuminated scan area so that they are incident on the illuminated scan area at substantially oblique angles.

19. The method of claim 18, wherein each of the reflecting steps comprises reflection by total internal reflection.

\* \* \* \* \*